United States Patent
Karkra et al.

(10) Patent No.: US 12,093,563 B2
(45) Date of Patent: Sep. 17, 2024

(54) ENDURANCE AWARE DATA PLACEMENT IN STORAGE SYSTEM WITH MULTIPLE TYPES OF MEDIA

(71) Applicant: Intel Corporation, Santa Clara, CA (US)

(72) Inventors: Kapil Karkra, Chandler, AZ (US); Mariusz Barczak, Gdansk (PL); Michal Wysoczanski, Koszalin (PL); Sanjeev Trika, Portland, OR (US); James Guilmart, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 17/084,301

(22) Filed: Oct. 29, 2020

(65) Prior Publication Data
US 2021/0048962 A1  Feb. 18, 2021

(51) Int. Cl.
*G06F 3/06* (2006.01)

(52) U.S. Cl.
CPC ........... *G06F 3/0659* (2013.01); *G06F 3/061* (2013.01); *G06F 3/0688* (2013.01); *G06F 2212/7201* (2013.01)

(58) Field of Classification Search
CPC ...... G06F 3/0659; G06F 3/061; G06F 3/0688; G06F 2212/7201
See application file for complete search history.

(56) References Cited

U.S. PATENT DOCUMENTS

| | | | |
|---|---|---|---|
| 10,809,931 B1 * | 10/2020 | Martin | G06F 3/061 |
| 2008/0263259 A1 * | 10/2008 | Sadovsky | G06F 3/0685 |
| | | | 711/E12.001 |
| 2019/0042139 A1 * | 2/2019 | Watt | G06F 3/0604 |

\* cited by examiner

*Primary Examiner* — Kalpit Parikh
(74) *Attorney, Agent, or Firm* — Essential Patents Group, LLP

(57) ABSTRACT

An embodiment of an electronic apparatus may include one or more substrates, and logic coupled to the one or more substrates, the logic to manage access to a storage system that includes a first persistent storage device and a second persistent storage device, capture input/output telemetry for a workload on the storage system, determine one or more write reduction factors and one or more write invalidation factors for the workload based on the captured input/output telemetry, and allocate storage for the workload between the first persistent storage device and the second persistent storage device based on the one or more write reduction factors and the one or more write invalidation factors. Other embodiments are disclosed and claimed.

14 Claims, 9 Drawing Sheets

ENDURANCE AWARE DATA PLACEMENT IN STORAGE SYSTEM WITH MULTIPLE TYPES OF MEDIA

BACKGROUND

NAND flash devices includes a variety of different types NAND-based media with different sets of characteristics. Single-level cell (SLC) NAND stores one bit in each cell, multi-level cell (MLC) NAND stores two bits in each cell, triple-level cell (TLC) NAND stores three bits in each cell, and quad-level cell (QLC) NAND stores four bits in each cell. In general terms, as the number of bits per cell increases, the endurance, performance, and expense generally decrease while the capacity increases.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
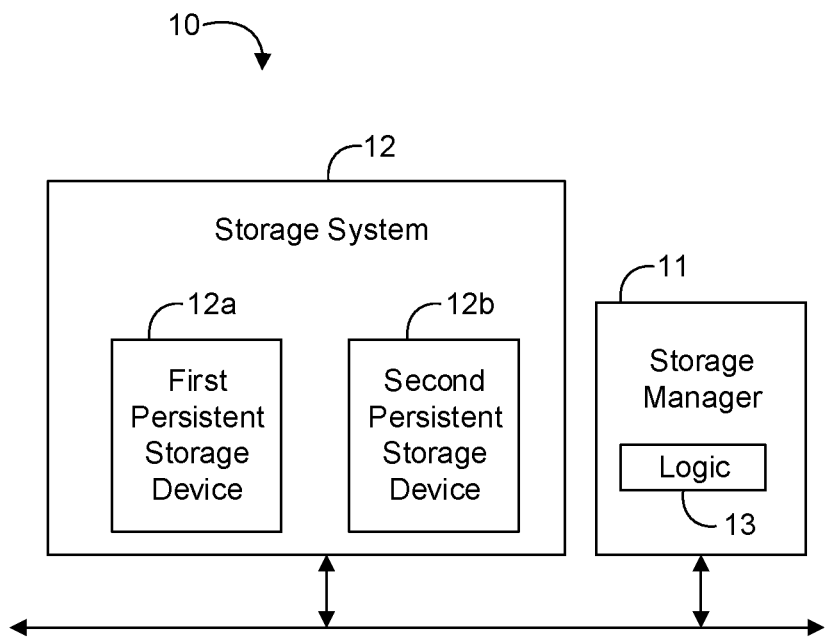
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; flash memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3-F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic system 10 may include a storage system 12 that includes a first persistent storage device 12a and a second persistent storage device 12b, and a storage manager 11 communicatively coupled to the storage system 12. For example, the first persistent storage device 12a may have a first set of storage characteristics (e.g., media type, block size, endurance, performance, etc.) and the second persistent storage device 12b may have a second set of storage characteristics that are different from the first set of storage characteristics. The storage manager 11 may include logic 13 to manage access to the storage system 12, capture input/output (IO) telemetry for a workload on the storage system 12 associated with a runtime application, determine one or more write reduction factors and one or more write invalidation factors for the workload based on the captured IO telemetry, and allocate storage for the workload between the first persistent storage device 12a and the second persistent storage device 12b based on the one or more write reduction factors and the one or more write invalidation factors. For example, the logic 13 may be configured to calculate a write reduction factor for an input/output transaction as a number of first persistent storage device writes divided by a number of host writes, and/or to calculate a write invalidation factor for an input/output transaction as a number of host writes divided by an amount of storage space occupied by the workload.

In some embodiments, the logic 13 may be configured to classify the IO telemetry into two or more data classes, calculate a write invalidation factor for each of the two or more data classes, and select a subset of the two or more data classes with the highest write invalidation factors for potential placement of data on the first persistent storage device. The logic 13 may be further configured to calculate a write reduction factor for each data class of the subset of the two or more data classes, determine if the subset of the two or more data classes meets one or more fitness criteria based on the calculated write invalidation factors and the calculated write reduction factors for the subset of the two or more data classes, and if so determined, place data that corresponds to the subset of the two or more data classes on the first persistent storage device 12a. In some embodiments, the workload may be associated with a runtime application and the logic 13 may be further configured to provide closed-loop allocation of storage between the first persistent storage device 12a and the second persistent storage device 12b at runtime based on the calculated write invalidation factors, the calculated write reduction factors, and the one or more fitness criteria. In any of the embodiments herein, the first persistent storage device 12a may comprise 3D crosspoint-based media (e.g., INTEL OPTANE TECHNOLOGY) and the second persistent storage device 12b may comprise NAND-based media.

Embodiments of each of the above storage manager 11, storage system 12, first persistent storage device 12a, second persistent storage device 12b, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the storage manager 11 may include a general purpose controller, a special purpose controller, a memory controller, a storage controller, a micro-controller, a general purpose processor, a special purpose processor, a central processor unit (CPU), an execution unit, etc. In some embodiments, all or portions of the storage system 12, the logic 13, and/or other system memory may be located in, or co-located with, various components, including the storage manager 11 (e.g., on a same die, in a same enclosure, etc.).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the storage system 12, other persistent storage media, or other system memory may store a set of instructions which when executed by the storage manager 11 cause the system 10 to implement one or more components, features, or aspects of the system 10 (e.g., the logic 13, managing access to the storage system 12, capturing the IO telemetry, determining the write reduction factors, determining the write invalidation factors, allocating storage for the workload between the first persistent storage device 12a and the second persistent storage device 12b, etc.).

Figure 2:
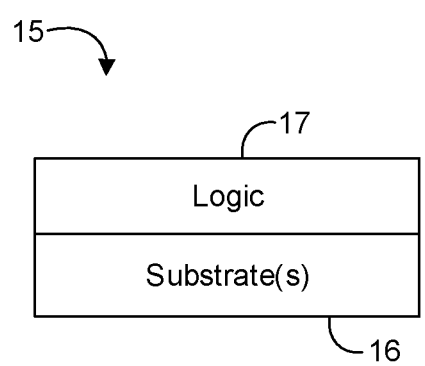
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to manage access to a storage system that includes a first persistent storage device and a second persistent storage device, capture IO telemetry for a workload on the storage system, determine one or more write reduction factors and one or more write invalidation factors for the workload based on the captured IO telemetry, and allocate storage for the workload between the first persistent storage device and the second persistent storage device based on the one or more write reduction factors and the one or more write invalidation factors. For example, the first persistent storage device may have a first set of storage characteristics (e.g., media type, block size, endurance, performance, etc.) and the second persistent storage device may have a second set of storage characteristics that are different from the first set of storage characteristics. In some embodiments, the logic 17 may be configured to calculate a write reduction factor for an IO transaction as a number of first persistent storage device writes divided by a number of host writes, and/or to calculate a write invalidation factor for an IO transaction as a number of host writes divided by an amount of storage space occupied by the workload.

In some embodiments, the logic 17 may be configured to classify the IO telemetry into two or more data classes, calculate a write invalidation factor for each of the two or more data classes, and select a subset of the two or more data classes with the highest write invalidation factors for potential placement of data on the first persistent storage device. The logic 17 may be further configured to calculate a write reduction factor for each data class of the subset of the two or more data classes, determine if the subset of the two or more data classes meets one or more fitness criteria based on the calculated write invalidation factors and the calculated write reduction factors for the subset of the two or more data classes, and if so determined, place data that corresponds to the subset of the two or more data classes on the first persistent storage device. In some embodiments, the workload may be associated with a runtime application and the logic 17 may be further configured to provide closed-loop allocation of storage between the first persistent storage device and the second persistent storage device at runtime based on the calculated write invalidation factors, the calculated write reduction factors, and the one or more fitness criteria. In any of the embodiments herein, the first persistent storage device may comprise 3D crosspoint-based media and the second persistent storage device may comprise NAND-based media.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
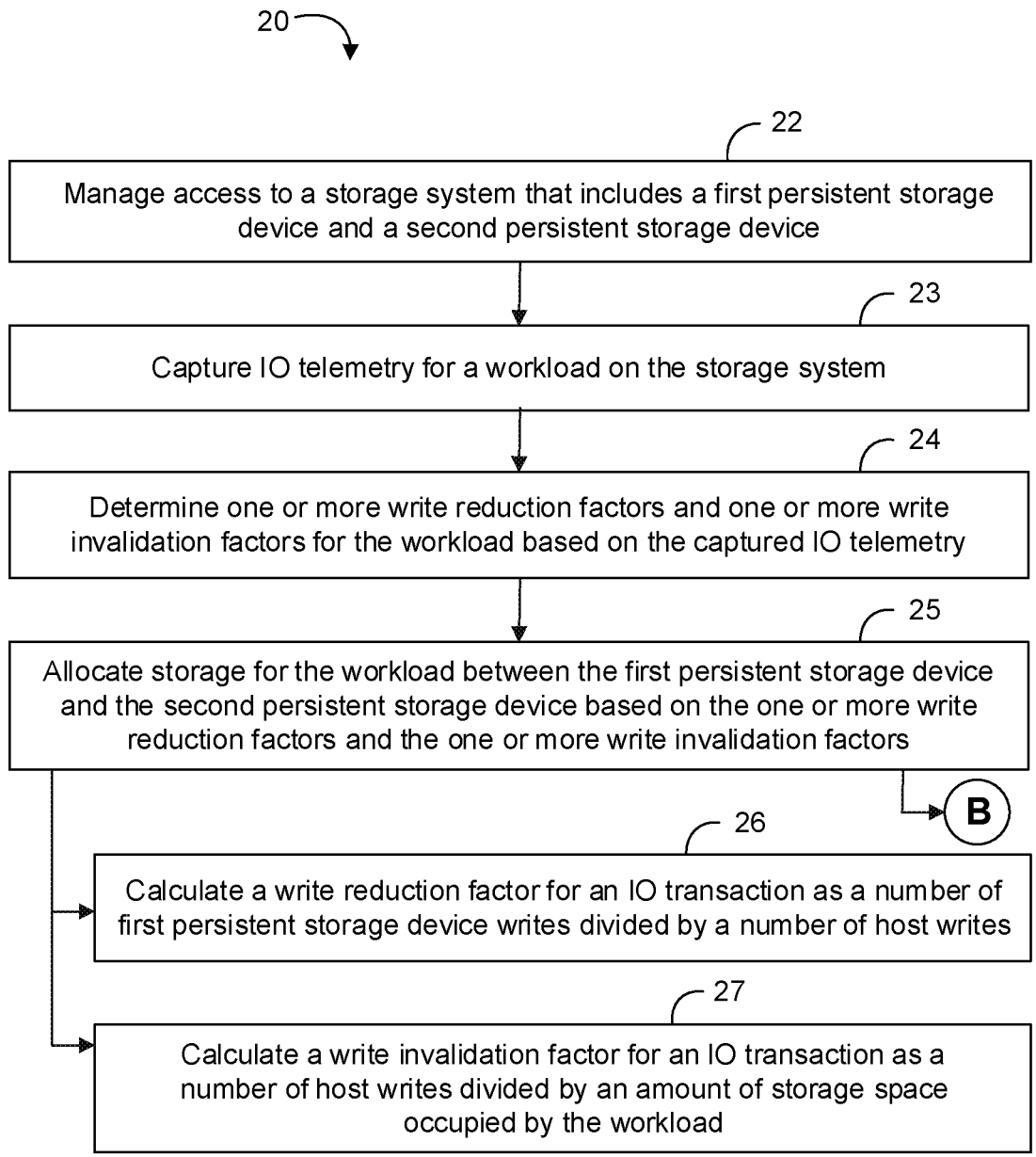
FIGS. 3A to 3B are flowcharts of an example of a method of managing storage according to an embodiment.
Figure 3B:
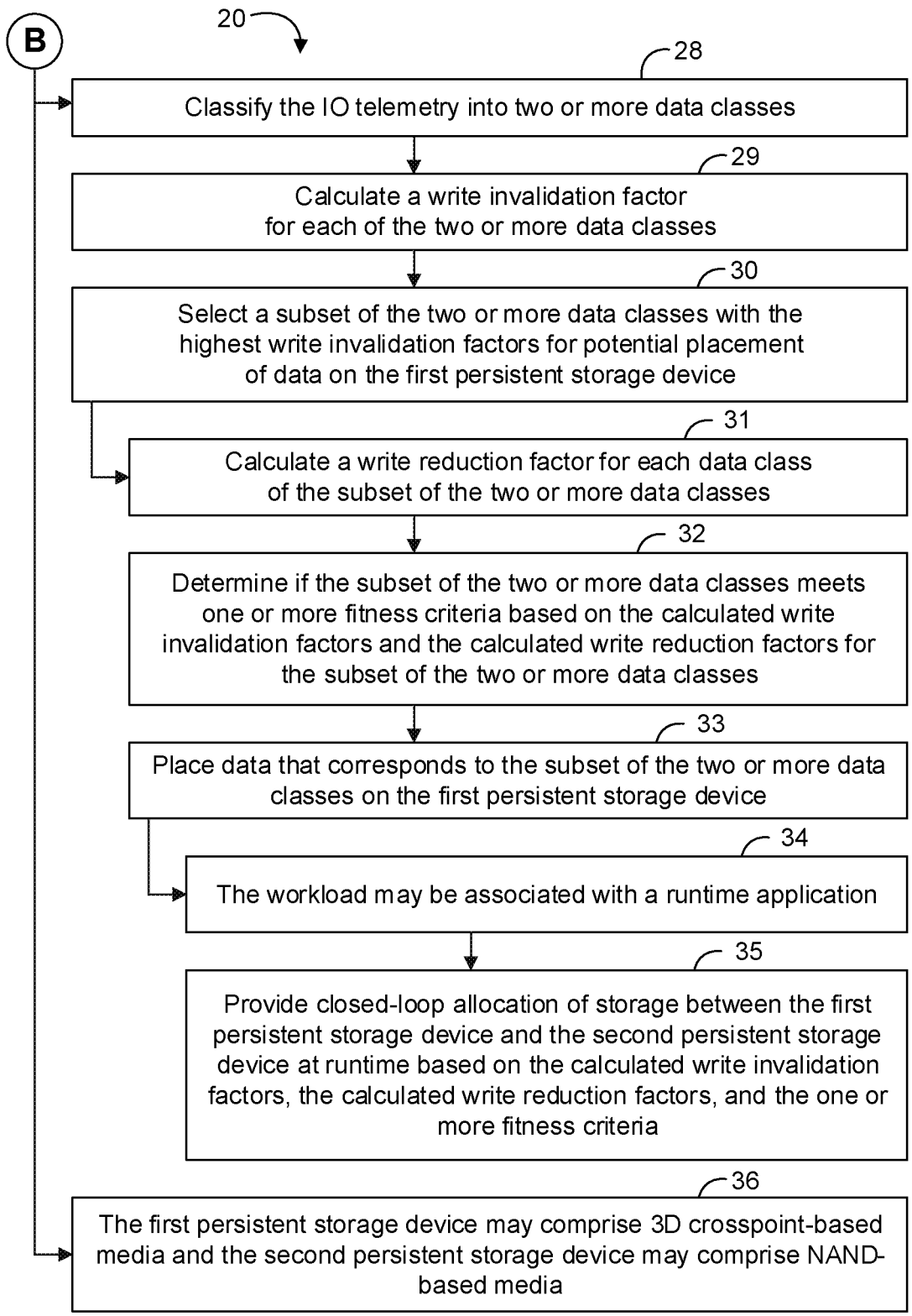

Turning now to FIGS. 3A to 3B, an embodiment of a method 20 of managing storage may include managing access to a storage system that includes a first persistent storage device and a second persistent storage device at box 22, capturing IO telemetry for a workload on the storage system at box 23, determining one or more write reduction factors and one or more write invalidation factors for the workload based on the captured IO telemetry at box 24, and allocating storage for the workload between the first persistent storage device and the second persistent storage device based on the one or more write reduction factors and the one or more write invalidation factors at box 25. For example, the first persistent storage device may have a first set of storage characteristics (e.g., media type, block size, endurance, performance, etc.) and the second persistent storage device may have a second set of storage characteristics that are different from the first set of storage characteristics. In some embodiments, the method 20 may further include calculating a write reduction factor for an IO transaction as a number of first persistent storage device writes divided by a number of host writes at box 26, and/or calculating a write invalidation factor for an IO transaction as a number of host writes divided by an amount of storage space occupied by the workload at box 27.

In some embodiments, the method 20 may further include classifying the IO telemetry into two or more data classes at box 28, calculating a write invalidation factor for each of the two or more data classes at box 29, and selecting a subset of the two or more data classes with the highest write invalidation factors for potential placement of data on the first persistent storage device at box 30. Some embodiments of the method 20 may further include calculating a write reduction factor for each data class of the subset of the two or more data classes at box 31, determining if the subset of the two or more data classes meets one or more fitness criteria based on the calculated write invalidation factors and the calculated write reduction factors for the subset of the two or more data classes at box 32, and if so determined, placing data that corresponds to the subset of the two or more data classes on the first persistent storage device at box 33. In some embodiments, the workload may be associated with a runtime application at box 34, the method 20 may further include providing closed-loop allocation of storage between the first persistent storage device and the second persistent storage device at runtime based on the calculated write invalidation factors, the calculated write reduction factors, and the one or more fitness criteria at box 35. In any of the embodiments herein, the first persistent storage device may comprise 3D crosspoint-based media and the second persistent storage device may comprise NAND-based media at box 36.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Some embodiments may advantageously provide technology for smart, endurance-aware data placement in a 3D crosspoint and NAND storage system. Flash storage is on a trajectory to become denser and cheaper. However, the performance/terabyte (TB) and endurance may be dropping. The 3D crosspoint media has characteristics which may be suitable to close this gap, but conventional storage management technology causes problems with performance and/or device endurance. Conventional disk caching/tiering systems typically use policies such as insert-all and least recently used (LRU)-evict. Other conventional storage management technology may include heuristics such as sequential IO detection and file-system hints, and frameworks such as feedback loops. However, none of these conventional storage management techniques are cognizant of the media characteristics, such as endurance, and consequently can burn out the underlying media.

The foregoing issue is especially problematic for write-intensive workloads, which may be relatively common, because conventional data placement can have not just a performance but also a data integrity impact due to device wear-out. While reads are readily cached in DRAM, writes generally must go to persistent media (e.g., 3D crosspoint or NAND), and mis-placing the writes (e.g., sending heavy write traffic to lower endurance media) can cause significant burn-out and device failures.

Advantageously, some embodiments provide technology for data placement metrics, the associated usage of the data placement metrics (e.g., algorithms), and a runtime tool to address one or more of the foregoing problems. In particular, some embodiments may determine that conditions exist in a workload to benefit from a caching/tiering hierarchy that combines 3D crosspoint and NAND media, and may further determine a better data placement across the media types to improve performance of the workload and/or endurance of the media. In some embodiments, data placement metrics may be utilized for data placement across a 3D crosspoint and NAND flash hierarchical storage system. For example, an embodiment of an assessment tool may determine mathematical fitness criteria for detecting workload conditions under which a workload may benefit from migrating from all flash storage to a mixed 3D crosspoint and NAND flash hierarchical storage. Some embodiments may apply the assessment tool at runtime to guide a runtime data placement engine to tier data across the mixed media storage at runtime in a closed feedback loop. For some deployments of a storage solutions on a production cluster, instead of manual tuning for a workload, some embodiments provide automated technology to determine a suitable software and hardware configuration and data placement very quickly.

Figure 4:
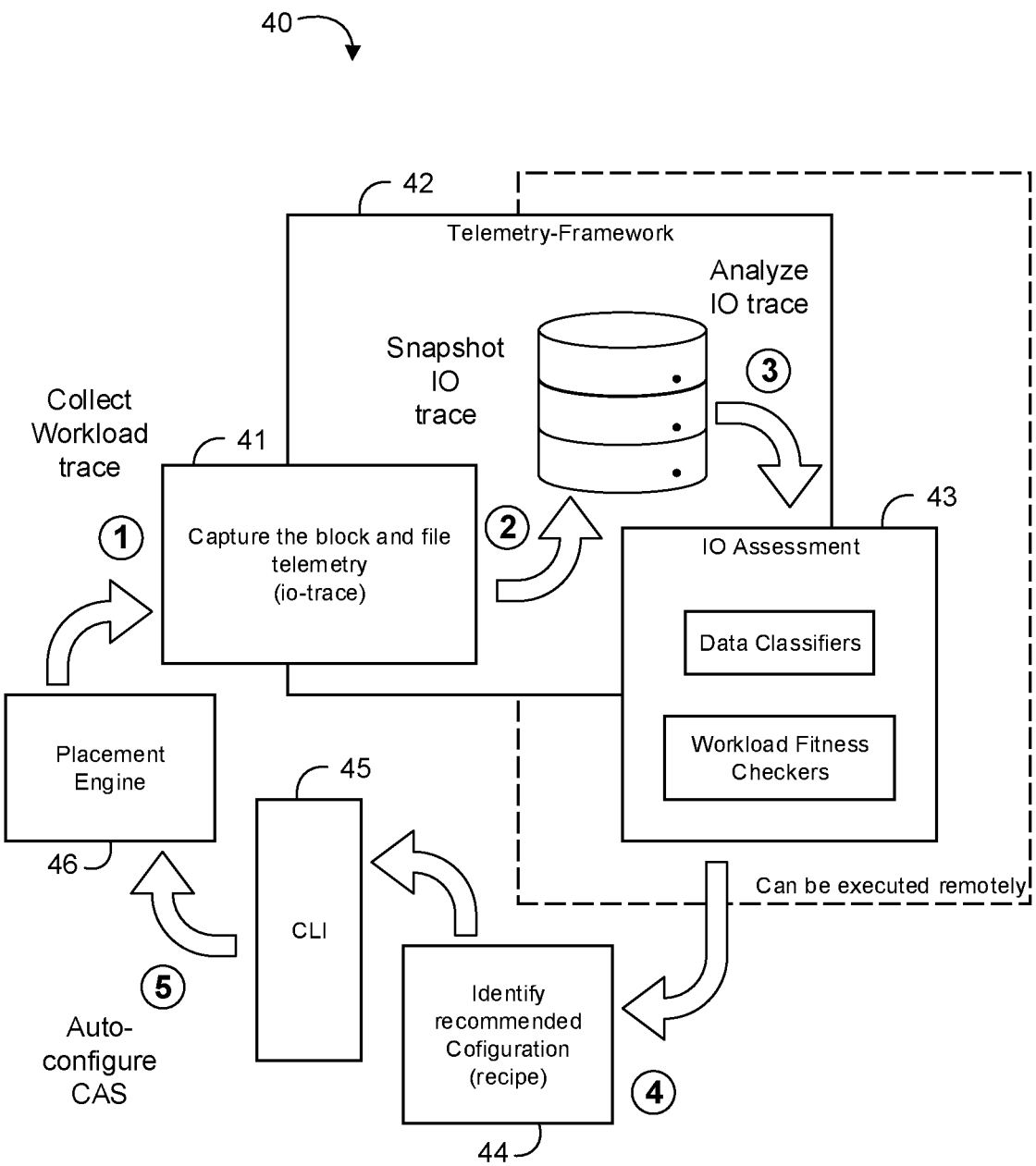
FIG. 4 is a block diagram of an example of a storage manager according to an embodiment.

With reference to FIG. 4, an embodiment of a storage manager 40 may include a trace module 41, a telemetry module 42, an assessment tool 43, a configuration module 44, a configuration descriptor 45, and a placement engine 46 arranged in a closed feedback loop as shown. At point 1, with the application is running, block and file telemetry are captured by the trace module 41 (e.g., IO traces, devices logs, etc.), which describe the application's workload. When enough events have been captured, the trace snapshot is assembled by the telemetry module 42, at point 2. Next, at point 3, the assessment tool 43 analyzes the trace snapshot. The assessment tool 43 uses various data classifiers to classify the workload into data classes and calculates fitness metrics for each data class. At point 4, the configuration module 44 then picks the description of best classes (e.g., a recipe) based on fitness criteria and, at point 5, passes the configuration descriptor 45 (e.g., a command line interface (CLI) file) to the placement engine 46. The storage manager 40 may perform the foregoing continuously with closed loop feedback to track any changes to the workload.

Figure 5:
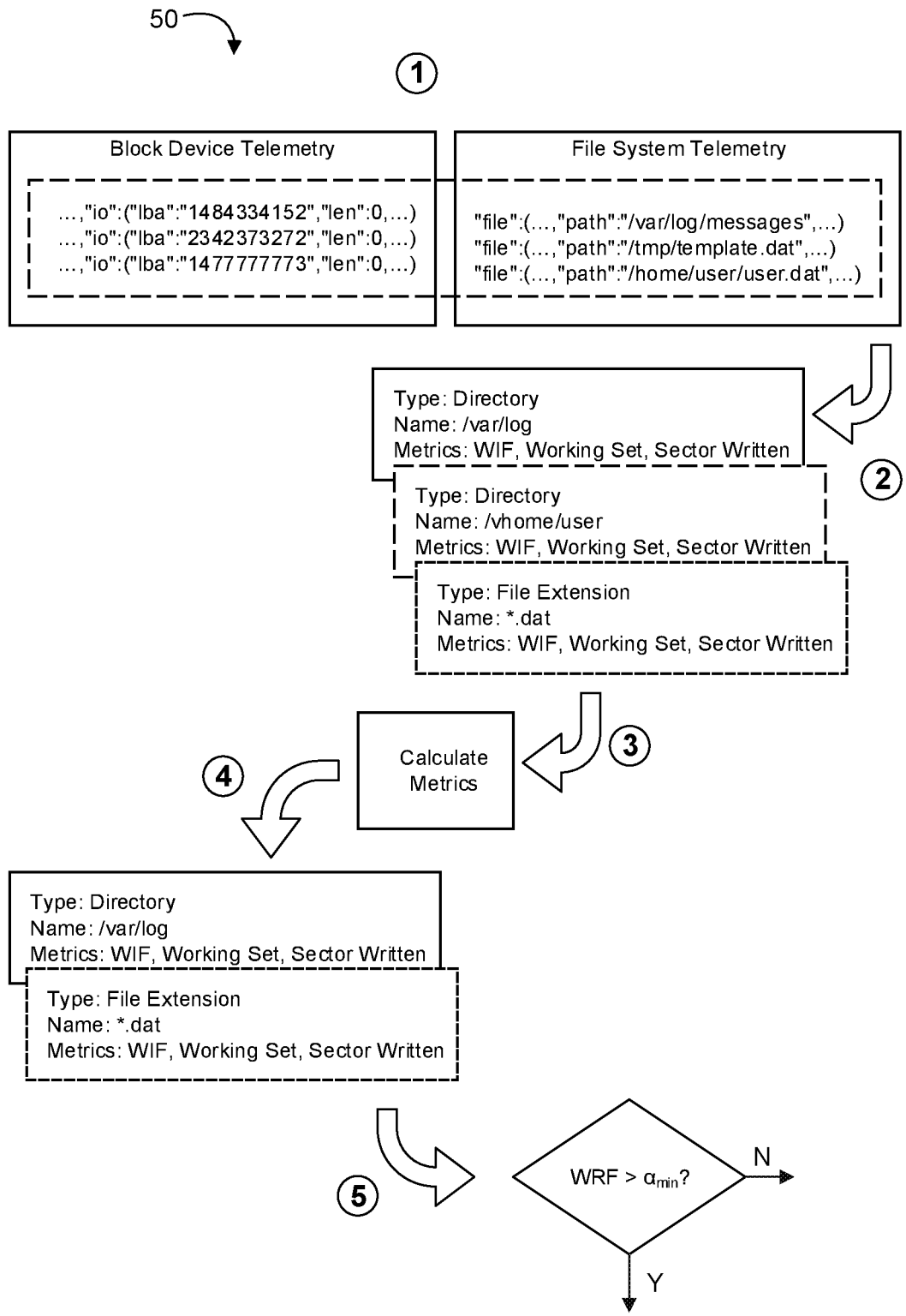
FIG. 5 is an illustrative diagram of an example of a process flow according to an embodiment.

With reference to FIG. 5, an embodiment of a process flow 50 for an assessment tool includes collecting the trace at point 1, parsing and classifying the workload into various data classes at point 2, calculating fitness metrics at point 3, sorting the data classes and selecting the best classes to place on 3D crosspoint media at point 4, and checking for the fitness of the workload at point 5 (e.g., determining if a calculated write reduction factor (WRF) exceeds a threshold of a minimum WRF ($\alpha_{min}$)).

Some embodiments utilize fitness metrics which correlate to the different characteristics of the media to improve performance and endurance of the storage system. For example, some embodiments utilize a write reduction factor and/or a write invalidation factor as fitness metrics. These fitness metrics may then be utilized to apply fitness criteria to determine if the workload would benefit from placing a portion of the workload on the 3D crosspoint media. For the purpose of illustration and not limitation, Table 1 includes example terms and description for an example mixed OPTANE (O) and NAND (N) storage system.

TABLE 1

| Term | Description |
| --- | --- |
| O + X > Y | OPTANE when combined with NAND increases endurance while simultaneously boosting performance and reducing costs where:<br>O = OPTANE:<br>X = lower cost, lower endurance media; e.g., QLC, penta level cell (PLC), etc.<br>Y = higher cost, higher endurance media; e.g., TLC, MLC, etc.<br>For example, if X = QLC (Q) and Y = TLC (T), the fitness criteria may be written as O + Q > T |
| WAF | Write Amplification Factor<br>WAF refers to a multiplier that reduces NAND SSDs' endurance and performance primarily due to on-SSD garbage collection<br>WAF = NAND writes/Host Writes<br>Host writes refers to bytes written by host to the SSD (as observed by the SSD-level monitor) |
| Occupancy | The amount of storage space the workload occupies |
| WRF ($\alpha$) | Write Reduction Factor<br>WRF refers to a percentage of writes that OPTANE may absorb and keep from going to NAND in an O + N hierarchy<br>$\alpha$ = OPTANE Writes/Application Writes<br>Application writes refers to bytes written by the application/workload (as observed by the application/workload monitor) |
| WIF ($\beta$) | Write Invalidation Factor<br>$\beta$ = Application Writes/Occupancy<br>What may make $\beta$ high:<br>1. A file/object written and deleted frequently (e.g., a short lifetime)<br>2. A logical block address (LBA) range updated frequently (e.g., write locality) |

For the purpose of illustration and not limitation, Table 2 provides examples of data classifiers and two mathematical fitness criteria formulas. Additional example calculations and associated assessment techniques are described in more detail below.

TABLE 2

| Data Classifiers | Fitness Type | Fitness Criteria |
| --- | --- | --- |
| Block Classifiers (prisms):<br>Lifetime hints vs. unclassified<br>Metadata vs. data<br>Direct IO vs. buffered IO<br>LBA range/partition<br>IO size<br>File Classifiers (prisms):<br>Directory name<br><br>File size<br>File type (file extension)<br>File name (base file name)<br>File offset<br>Other Classifiers:<br>Process id<br>Virtual Machine id<br>Machine Learning based<br>Top M records | O + X > Y<br><br><br><br><br><br><br><br><br><br><br><br><br>O + N | ($\Sigma W_{hot}$ < O) && ($\Sigma w_{hot}/\Sigma w_k$ > $\alpha_{min}$)<br>(~50%)<br>$\beta w$ = w/W and $\beta o$ = ($\alpha$w)/O<br>$\Sigma w_{hot}$ = total bytes written by highest $\beta$ classes that fit OPTANE<br>$\Sigma w_k$ = total bytes written by all k classes<br>WRF = $\Sigma w_{hot}/\Sigma w_k$<br>W = occupancy<br>O = OPTANE capacity<br>w = total bytes written by workload<br>RPBW = relative petabytes written<br>$\alpha_{min}$ = 1 − RPBW$_Q$/RPBW$_T$ (~65%)<br>$\beta_k$ > $\beta_{cutoff}$<br>(The subset of workload with $\beta$ value above $\beta_{cutoff}$ is cheaper to store on OPTANE)<br>$\beta_{cutoff}$ = [c$_N$ − c$_O$]/[c$_O$/D$_O$ − c$_N$/D$_N$]<br>c = unit cost of media ($/GB)<br>D = drive writes per day (DWPD) of media (for occupancy W)<br>Suffixes O and N stand for OPTANE and NAND respectively |

Figure 6:
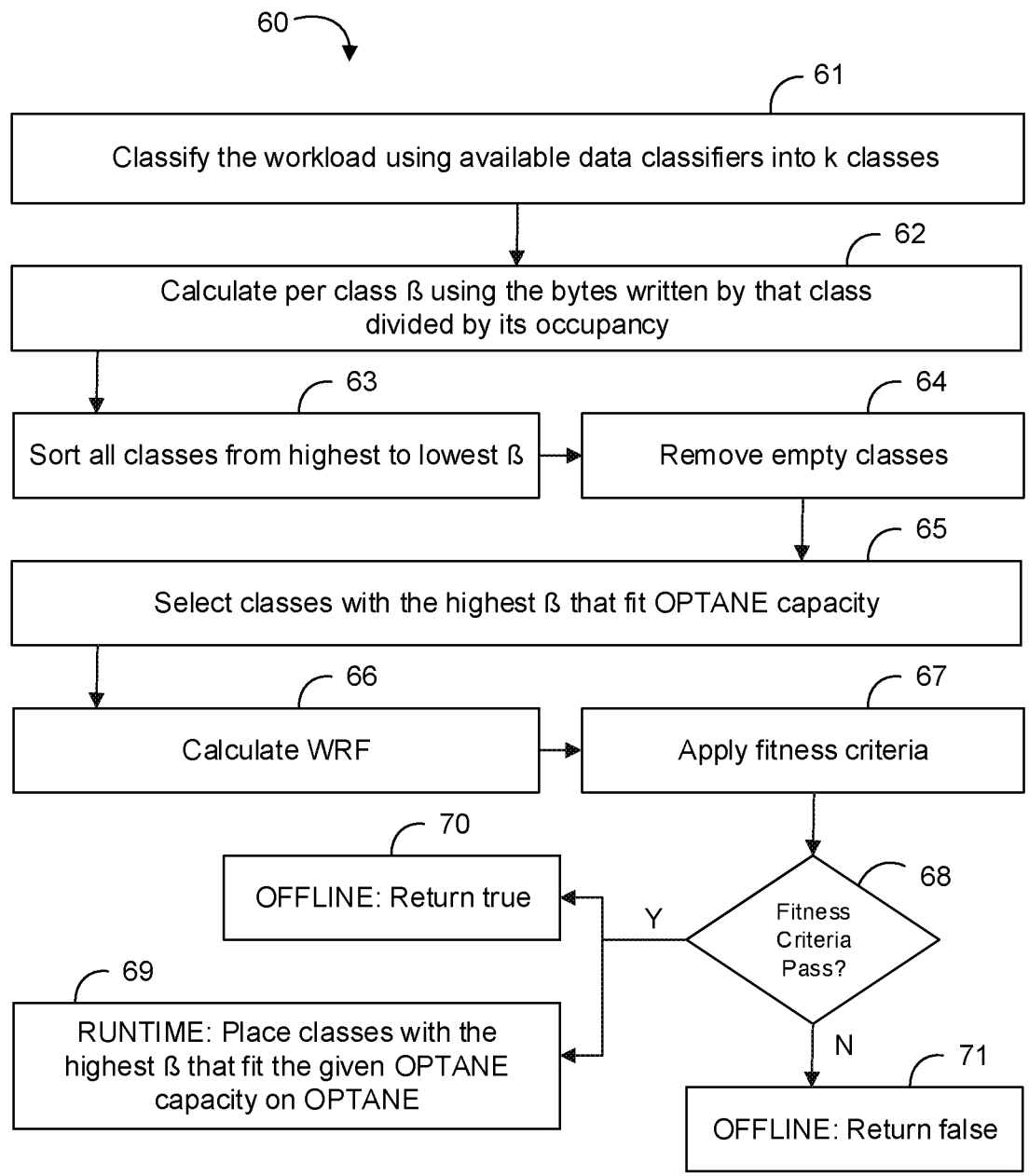
FIG. 6 is a flowchart of another example of a method of managing storage according to an embodiment.

With reference to FIG. 6, an embodiment of a method 60 of managing storage may include both assessment tool techniques and placement engine techniques (e.g., how the data placement is determined at runtime). In an offline analysis application, the assessment tool may be run on a pre-captured trace. In a runtime application, the runtime data placement may be calculated based on real-time traffic. In some embodiments, the OPTANE capacity may be pre-calculated from the pricing model (e.g., Price$_{OPTANE+QLC}$<Price$_{TLC}$) and $\alpha_{min}$ from empirical values of endurances for the given workload. Some embodiments may also pre-calculate $\beta_{cutoff}$ from relative unit costs and endurances of OPTANE and NAND media. Some embodiments of the method 60 may include classifying the workload using available data classifiers (e.g., as noted in Table 2) into k classes at box 61. For example, a RocksDB write-ahead log (WAL) class can be classified using the 'Directory Name' because all IOs belonging to the WAL are stored under the WAL_DIR directory. In this phase an IO can belong to multiple classes because of simultaneous application of multiple classifiers.

The method 60 may then include calculating per class $\beta$ using the bytes written by that class divided by its occupancy at box 62, and sorting all classes from highest to lowest ß at box 63. At box 61, a particular IO may be part of multiple classes. To keep an IO only in its highest ß class, the IO may be removed from all other classes to not count the IO multiple times. Accordingly, some embodiments may include another phase for re-parsing the trace and re-calculating ß per class. After this phase, the IO can belong to one and only one class. The method 60 may then include removing empty classes at box 64, and selecting classes with the highest ß that fit OPTANE capacity at box 65. Note that the last class may fit only partially.

The method 60 may then include calculating WRF ($\alpha$) (e.g., using the formula WRF=$\Sigma w_{hot}/\Sigma w_k$ noted in Table 2) at box 66, and applying the fitness criteria (e.g., as noted in the Table 2) at box 67, to determine if OPTANE+NAND tiering/caching will benefit the workload. The method 60 may then include determining if the fitness criteria pass at box 68, and, if so determined, for runtime placement the method 60 may proceed to placing classes with the highest ß that fit the given OPTANE capacity on OPTANE at box 69. For offline analysis, if the fitness criteria pass at box 68 the method 60 may including returning 'true' at box 70, or otherwise returning 'false' at box 71.

Advantageously, some embodiments may provide better endurance with a multiple media 3D crosspoint and NAND storage system as compared to a storage system that utilizes only NAND-based media. For example, data placement in accordance with some embodiments on a MongoDB workload may yield 10× better endurance on an OPTANE+QLC system as compared to a TLC only system and 45× better as compared to a QLC only system. In another example, data placement in accordance with some embodiments on a RocksDB workload results show 4× improvement in system storage endurance on an OPTANE+QLC system.

Figure 7:
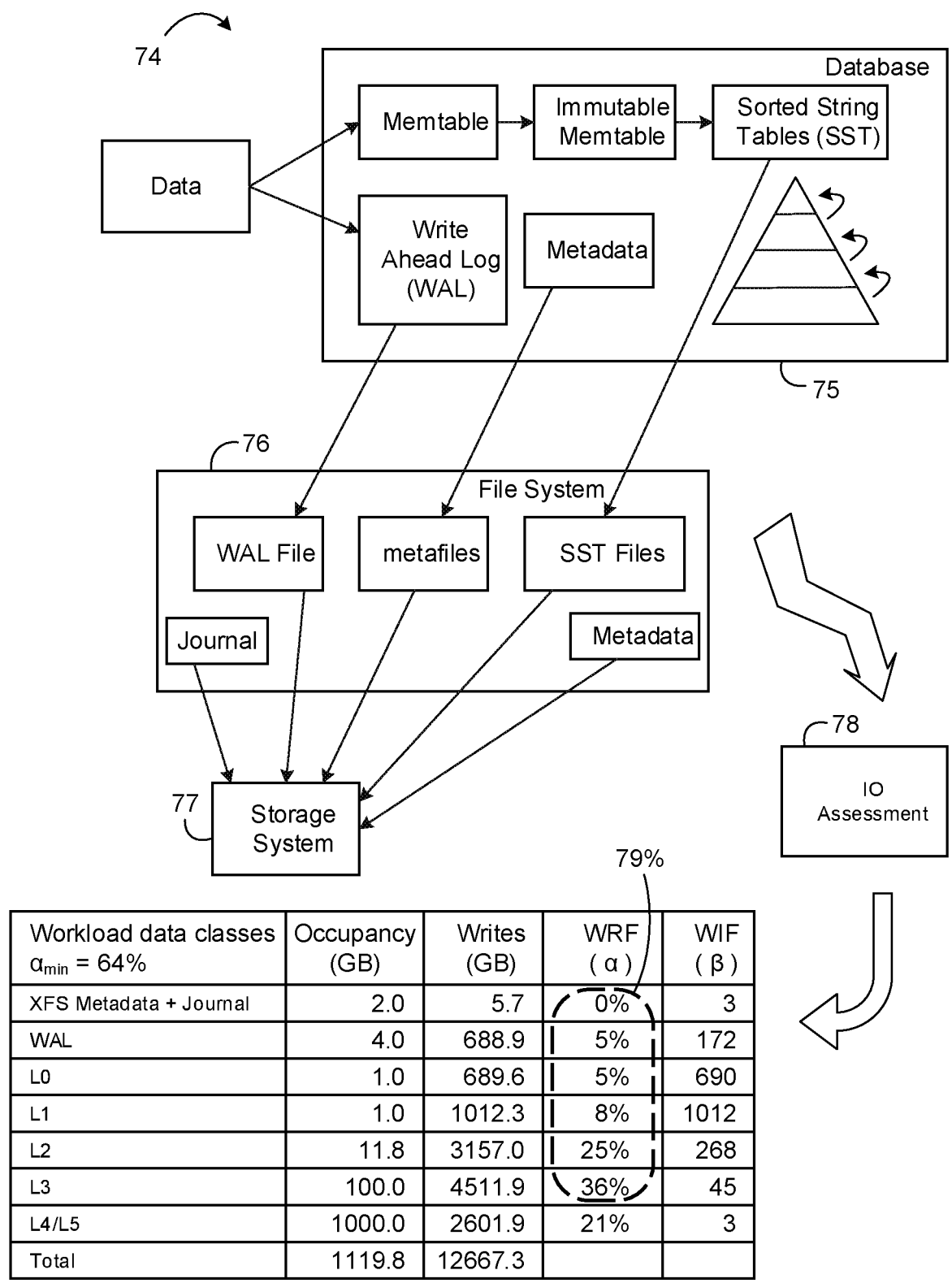
FIG. 7 is a block diagram of an example of a computing system according to an embodiment.

With reference to FIG. 7, an embodiment of a computing system 74 may include a database 75 supported by a file system 76 stored on a storage system 77. The computing system 74 may further include an IO assessment tool 78 with one or more of the features described herein. For the purpose of illustration and not limitation, the following example includes a key-value (KV) store database such as RocksDB for the example workload. The RocksDB database application may generate a variety of different data classes including a WAL file, metadata files, and Sorted String Table (SST) files at different levels that all go to different NAND tiers. At its core, RocksDB is a log-structured merge (LSM) tree-based KV store. A typical write path for a KV insert/update may include the following IO transactions:
1. Write the key and value to the memory (memtable) and to the write ahead log (WAL).
2. After memory collects up enough keys and values, the immutable memtable is flushed to the SSD in a SST file format (e.g., *.sst). At this point, The RocksDB application deletes the WAL and the incoming keys and values are stored in another active memtable.
3. Overtime, the duplicate keys and values tie up the SSD capacity that a compaction process handles by performing leveled merge sorts. The LSM organizes itself into different levels where the files in lower levels (e.g., level 0, level 1, etc.) contain recent data and are deleted more frequently while the higher levels (e.g., level 4, level 5, etc.) contain older, more stable data.

FIG. 7 shows example calculations of ß for various data classes. The assessment tool 78 determines that an example WAL file was only 4 GB, but was written and deleted frequently. While the WAL file occupied only 0.05% of storage space, the WAL file contributed to about 5% of the total writes. Similarly, the assessment tool 78 determines that lower LSM levels L0, L1, L2, and L3 collectively occupied only about 120 GB of the storage space, but all together contributed to about 75% of the total writes. Overall, about 80% of the total writes only needed about 120 GB of space and the assessment tool determines that the associated data fits into an example 375 GB OPTANE SSD (e.g., INTEL model no. P4800X). As compared to a storage system with only TLC NAND-based media (e.g., INTEL SSD model no. P4510) or a storage system with only QLC NAND-based media (e.g., INTEL SSD model no. P4320), embodiments of a storage system with both OPTANE and QLC NAND-based media (e.g., P4800X and P4320) show improved endurance (e.g., 1.5× better for O+Q vs TLC; 4× better for O+Q vs QLC), improved write bandwidth (e.g., 1.4× better for O+Q vs TLC; 1.6× better for O+Q vs QLC), and improved P99.99 read tail latency (e.g., 2× better for O+Q vs TLC; 5× better for O+Q vs QLC), In the following description, the words stream and data class are interchangeable. The two criteria developed in this example identify conditions that indicate that a given workload may benefit from migration from a TLC(T)-based storage device to a combined OPTANE (O) and QLC (Q) storage system (O+Q). Empirical data may be collected by running the workload and achieving a workload specific steady state. The variable w represents the number of bytes that a given workload writes in a given period. The variable W represents the total LBA space that the workload can access. In a TLC system, W becomes the capacity of a TLC collection. In an O+Q cached system, the capacity is equal to the capacity of QLC. To establish an equivalence across O+Q and T, the capacity of O+Q system must be W. In addition, the exposed capacity of O+Q is assumed to be equal to Q:

$$O \text{ union } Q = W = Q$$

Furthermore, the workload may be assumed to spread the bytes written across O and Q; O receives o bytes while Q receives q bytes:

$$o + q = w$$

$\alpha$=Write reduction factor (WRF)=fraction of writes that goes to O, therefore:

$$o = \alpha * w$$

and $$q = (1-\alpha) * w$$

To maximize endurance across Q and Q, embodiments advantageously wear level across O and Q by redirecting a percentage of workload writes to O that never go to Q.

Embodiments continue to increase $\alpha$ (percentage of writes redirected to O) from zero to a minimum acceptable level ($\alpha_{min}$) where the percent life consumed by w workload on Q is equal to percent life consumed on T (presuming O has more life than Q; Q is generally more limiting in the O+Q endurance). As $\alpha$ is further increased, an optimal point ($\alpha_{optimal}$) may be reached where wear levelling is performed across OPTANE and QLC perfectly. In this case, the endurance of O+Q system will be additive. If $\alpha$ continues to increase, the farthest point ($\alpha_{max}$) may be reached where O+Q will still be competitive with T. In some applications, OPTANE may be the limiter of endurance between $\alpha_{optimal}$ and $\alpha_{max}$. The O+Q system stays competitive with T for all values of a between $\alpha_{min}$ and $\alpha_{max}$, which indicates a condition under which a workload may benefit from migrating to an O+Q system with appropriate data placement as described herein.

For a fitness check for O+Q>T, an example fitness criteria may correspond to a percentage of writes to OPTANE. For example, for a given workload on an O+Q storage system, there may be respective minimum, optimal, and maximum percentages of writes to OPTANE. Quantitatively, petabytes written (PBW) to OPTANE ($PBW_O$) may represent an amount of writes that the available OPTANE capacity can absorb. Similarly, $PBW_Q$ may represent an amount of writes that the available QLC capacity can absorb, and $PBW_T$ may represent an amount of writes that the available TLC capacity can absorb. Empirically, when a workload is run that generates w bytes, intermediate software layers like databases, file systems, RAID, etc. will change these numbers and, at the SSD level, amplified Host writes may be observed. These Host writes will further amplify inside the SSD by a factor of SSD WAF to result in Media writes equal to Host writes×WAF. Effectively, w bytes consume a net Media writes worth of endurance on the SSD. The net write amplification incurred by a workload (e.g., either by software layers or by the SSD) may be expressed as Media writes/w. An endurance metric effective PBW (EPBW) may represent the SSD's best-case PBW for sequential workloads (e.g., as reduced by the WAF):

$$EPBW=PBW/(Media\ Writes/workload\ writes)=PBW*workload\ writes/media\ writes$$

$$EPBW_T=PBW_T*w/TLC\ Writes=PBW_T*w/((NAND\ writes/Host\ writes)*Host\ writes)$$

$$EPBW_T=PBW_T \cdot w/(WAF_T*Host\ writes)=w*(PBW_T/WAF_T)/Host\ writes=w*RPBW_T/Host\ Writes$$

Reduced $PBW_T$ or $RPBW_T$ is $PBW_T/WAF_T$

Host writes may be observed from the SSD log pages along with the WAF while w may be observed from benchmark's logs. Also, note that $WAF_T$ is dependent on the workload itself. For example, a workload that creates random invalidity across the entire TLC capacity would make $WAF_T$ higher.

For the O+Q>T, the following condition must be true:

$$EPBW_T<=EPBW_{O+Q}$$

$$EPBW_T<=Min(EPBW_O, EPBW_Q)$$

As noted above, α (percentage of writes redirected to OPTANE) may continue to increase from zero to a minimum acceptable value where the percent life consumed by w workload on QLC is equal to percent life consumed on TLC. Normalized to the EPBW metric noted above:

$$EPBW_T=EPBW_Q$$

$$w*RPBW_T/Host\ Writes=w*RPBW_Q/QLC\ Host\ Writes$$

$$RPBW_T/Host\ Writes=RPBW_Q/(1-\alpha)*Host\ Writes$$

$$RPBW_T=RPBW_Q/(1-\alpha)$$

$$1-\alpha=RPBW_Q/RPBW_T$$

$$\alpha_{min}=1-RPBW_Q/RPBW_T$$

For example, if $WAF_T=WAF_Q$ $\alpha_{min}=1-PBW_Q/PBW_T=1-12.3/42=71\%$

For append-only workloads, at least 71% of the writes should go to OPTANE. Similarly, for an optimal value of α, the following condition should be true:

$$EPBW_O=EPBW_Q$$

$$w*PBW_O/(\alpha*Host\ Writes)=w*RPBW_Q/(1-\alpha)Host\ Writes$$

$$PBW_O/\alpha=RPBW_Q/(1-\alpha)$$

$$PBW_O*(1-\alpha)=RPBW_Q*\alpha$$

$$\alpha_{optimal}=PBW_O/(PBW_O+RPBW_Q)$$

For this example, the $\alpha_{optimal}$ is 41/(41+12.3)=77%. Lastly, for maximum value of α, the following condition should be true:

$$EPBW_T=EPBW_O$$

$$w*RPBW_T/Host\ Writes=w*PBW_O/(\alpha\ Host\ Writes)$$

$$RPBW_T=PBW_O/\alpha$$

$$\alpha_{max}=PBW_O/RPBW_T$$

For this example, $\alpha_{max}$ is 41/42=98%.

Another example fitness criteria for O+Q>T may correspond to a locality/shortness of lifetime factor. According to the preceding example fitness criteria, at least an $\alpha_{min}$ percentage of workload bytes are redirected to be written to OPTANE. However, the workload bytes must be short enough lifetime or have strong locality such that a small OPTANE has room to fit such a large volume of writes. As noted above, ß=Write invalidation factor (WIF)=w/W=average writes per LBA. For example, a journal file written and deleted or an LBA range updated frequently within seconds has higher WIF, and the higher the WIF, the shorter the lifetime.

WIF for OPTANE portion of the workload:

$$\beta_o=o/O=(\alpha*w)/O$$

WIF for the overall workload:

$$\beta_w=w/W$$

Accordingly:

$$\beta_o/\beta_w=((\alpha*w)/O)/(w/W)=\alpha*W/O$$

$$\beta o=(\alpha*W/O)*\beta_w$$

Based on the foregoing, a second fitness criteria for O+Q>T may represent how a QLC to OPTANE capacity ratio dictates the degree of hotness/locality/shortness of lifetime required in the workload, such that writes redirected to OPTANE should have a α*W/O times shorter lifetime.

Fitness Check Assessment Method

Another fitness check may relate to cost (e.g., which may be monetary cost, but may also be some nominal resource cost). In practice, a workload would have multiple streams (e.g., MongoDB journal and data streams; VROC partial parity log, parity, and data streams; or RocksDB WAL, L0, L1, L2, L3, etc.). In the case where there are "n" streams and "i" of them hot, then some embodiments may check for the following condition:

$$\Sigma w_i/\Sigma w_n > \alpha_{min}\ \&\&\ \Sigma W_i < O$$

The below process checks for the fitness of a workload on O+Q to be cost competitive with T criteria:

1. Determine $\alpha_{min}$ from an endurance model, and required O capacity from a pricing model.

2. Organize the streams according to the WIF. For example, Table 3 shows and example RocksDB workload classified into streams according to WIF:

TABLE 3

| RocksDB ($\alpha_{min}$: 76%) | LBA space (GB) | cLBA space | Writes (w) | WIF ($\beta$) | cWRF ($\alpha$) |
|---|---|---|---|---|---|
| WAL | 4.0 | 4.0 | 688.9 | 172.2 | 5% |
| L0 | 1.0 | 5.0 | 689.6 | 703.7 | 11% |
| L1 | 1.0 | 6.0 | 1012.3 | 1033.0 | 19% |
| L2 | 11.8 | 17.8 | 3157.0 | 266.9 | 44% |
| L3 | 100.0 | 117.8 | 4511.9 | 45.1 | 79% |
| L4 | 1000.0 | 1117.8 | 2601.9 | 2.6 | 100% |

3. Start from the top and cumulatively calculate both $\Sigma w_i/\Sigma w_n$ and $\Sigma W_i$ while checking for two conditions. If a table entry violates capacity constraint, place part of that row until the WRF becomes $>=\alpha_{min}$.

Based on the framework described above, two characteristics of workloads where O+Q becomes competitive with T may be identified. Some embodiments may check if two conditions are met:

Condition 1: The workload contains at least two sets of streams, hot and cold, with a large volume of writes (e.g., $\alpha_{min}$ about ~70%) belonging to the hot set (e.g., databases like MongoDB/RocksDB with write ahead logs/journals for power-fail safety, RAID systems with logging-based solutions to close the RAID write hole, etc.); and Condition 2: The required degree of temporal write locality or shortness of lifetime on average for hot streams is about 15× more than cold streams so that the hot writes fit the small 5% of the OPTANE capacity.

The foregoing set of rules advantageously identify which streams may be placed on OPTANE to provide a benefit for an O+Q storage system, and compete with single NAND-based media storage (e.g., TLC only, QLC only, etc.).

For purposes of illustration and not limitation, the following describes further example workload characteristics for OPTANE to be competitive with NAND. Considering that every workload (K) is a summary of classifiable subcomponents/data classes ($k_n$):

$$K=\Sigma k_n = k_1+k_2+k_3+ \ldots +k_n$$

Each k may be evaluated as an independent workload which may be assessed for which media it would be cheapest to store on. Each k has the characteristics of:

$$k_n=\{W_n(\text{LBA space}); w_n(\text{\#bytes written}); WAF_{n,media}\}$$

where $WAF_{n,media}$ represents various WAFs that are media dependent. The ratio of w to W dictates how often data in a certain class is invalidated. In various examples herein, this ratio is referred to as WIF or $\beta$.

$$WIF = \beta_n = \frac{w_n}{W_n}$$

The $\beta$ relationship determines which media type will be cheapest to store the workload on in the long run. A workload with a high $\beta$ (driven by a high w/low W) indicates that the workload is invalidated frequently and endurance is a concern. Because OPTANE has very cost effective cost/GB endurance, these workloads may be preferred to be placed on OPTANE. A workload with a low $\beta$ (driven by low w/high W) indicates that the workload is a large write that is not rewritten, like a write once—read many. These workloads may be preferred to be placed on QLC due to a more cost effective cost/GB.

Figure 8:
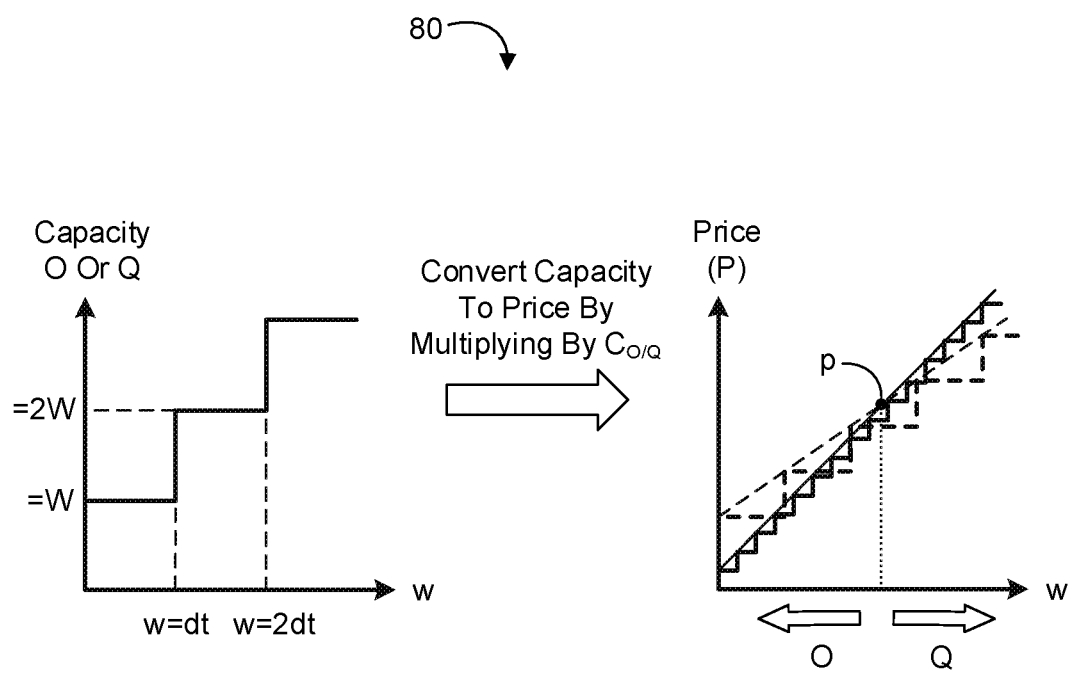
FIG. 8 is an illustrative diagram of another example of a process flow according to an embodiment.

With reference to FIG. 8, a set of charts shows an embodiment of a process flow 80 to find a threshold line for deciding which media type is most cost effective for a given k by looking at a trace of workload K over time t (e.g., where t may be measured in days). For the following example, there are two types of media (e.g., OPTANE (O) and QLC (Q)) to evaluate and determine which is cheaper to store the various k components from K. Each media type has some defining characteristics:

Endurance $D(dwpd)$, or $D*W(W$ per day)
endurance=$d(W$ per day)

where $d*t=(W$ per time t) refers to the endurance allowance for the trace time period.

Capacity O or $Q(GB)$

Unit Cost $c_O$ or $_Q\left(\frac{\$}{GB}\right)$

For simplicity, all WAFs are assumed to be equal to 1, and the platform may be assumed to be used for 5 years. Variable factors may be added in later to adjust for different values. Each subcomponent k will commit to an LBA span of W until the endurance of that LBA is used up. Then the subcomponent will need another chunk of media at size W, and continue on with this pattern of consumption of media. As illustrated in FIG. 8, the chart of capacity versus w shows how, as k continues, the amount of media needed by k may be determined. Similar charts may be determined for each media type, but instead of using capacity, the chart may show price (P) versus w, which equals O*c or Q*c. Each k needs its own chart because W changes the size of the "steps" and impacts the intersection point, such that the intersection point is not purely a function of w. The intersection may be determined by calculating an appropriate set of variables using y=mx+b linear definitions:

$P_O$ = Price on Optane; $P_Q$ = Price on QLC

Intersection (cutoff) is where $P_O = P_Q$ $P = mx + b$ $b = W * c$ $m = \frac{\Delta y}{\Delta x} = \frac{W * c}{d * t}$ $x = w$ $P = \frac{W * c}{d * t} * w + W * c$ With the specific media and workload variables:

$$P_O = P_Q = \frac{W_n * c_o}{d_o * t} * w_n + W_n * c_0 = \frac{W_n * c_Q}{d_Q * t} * w_n + W_n * c_Q$$

Substituting d=D*W:

$$\frac{W_n * c_o}{D_O * W_n * t} * w_n + W_n * c_0 = \frac{W_n * c_Q}{D_Q * W_n * t} * w_n + W_n * c_Q$$

Removing $W_n$ from the numerator and denominator:

$$\frac{c_O * w_n}{D_O * t} + W_n * c_O = \frac{c_Q * w_n}{D_Q * t} + W_n * c_Q$$

$$\frac{c_O * w_n}{D_O * t} - \frac{c_Q * w_n}{D_Q * t} = W_n * c_Q - W_n * c_O$$

$$w_n * \left[\frac{c_O}{D_O * t} - \frac{c_Q}{D_Q * t}\right] = W_n * [c_Q - c_O]$$

From the foregoing, it is apparent that the cutoff is a function of w and W. The variable β which relates these two variables together:

$$\beta_{cutoff} = \frac{w_n}{W_n} = \frac{[c_Q - C_O]}{\left[\frac{c_O}{D_O * t} - \frac{c_Q}{D_Q * t}\right]}$$

Finally, time (t) may be factor outed (e.g., where t is the length of the trace). The variable $\beta_{cutoff}$ is a function of time (t) that the trace is taken. As the trace time increases W will/may stay the same while w will increase continually as more is written by the workload.

$$\beta_{cutoff} = \frac{w_n}{W_n} = \frac{[c_Q - C_O]}{\left[\frac{c_O}{D_O * t} - \frac{c_Q}{D_Q * t}\right]} = \frac{[c_Q - C_O]}{\left[\frac{c_O}{D_O} - \frac{c_Q}{D_Q}\right] * \frac{1}{t}}$$

So $$\beta_{cutoff} = \frac{w_n}{W_n} = \frac{[c_Q - c_O]}{\left[\frac{c_O}{D_O * t} - \frac{c_Q}{D_Q * t}\right]} * t = \frac{[c_Q - c_O]}{\left[\frac{c_O}{D_O} - \frac{c_Q}{D_Q}\right]} * t$$

The variable $\beta_{cutoff}$ represents the point where the cost to store k on O is the same as the cost to store k on Q. Accordingly, if $\beta_k$ is above the value of $\beta_{cutoff}$, storing k on OPTANE may be cheaper (e.g., from a total cost of ownership (TCO) perspective). The actual value of β is a function of time (t) that the trace is run. The longer the trace, the higher the β needed to justify OPTANE use. However, we can normalize the calculations of β and $\beta_{cutoff}$ by eliminating time from the above equation.

From the right of the equation, it is apparent that the cut off is dependent only on the media characteristics. Specifically, the cut off depends on the ratio between the $/GB and the $/GB of endurance between the two types media. Advantageously, embodiments of this process work for any classifiable k. For a given K, all $k_n$ may run through this process and identify which media to pin each k to. From there, a storage pool may be constructed of O and Q by using the actual models available for each drive. Moreover, embodiments of the process may be applied for any of a number of different media types to create various storage solutions and determine what the cheapest solution is.

Additionally, or alternatively, some embodiments may determine how many drive replacements may be needed over time for a given Workload K and the defined storage solutions identified by the calculations:

Drive replacements=risk for random failures;

Drive Replacements=labor costs;

Drive replacements=exposure to NAND media costs (e.g., supply/demand fluctuations) and availability concerns.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 9:
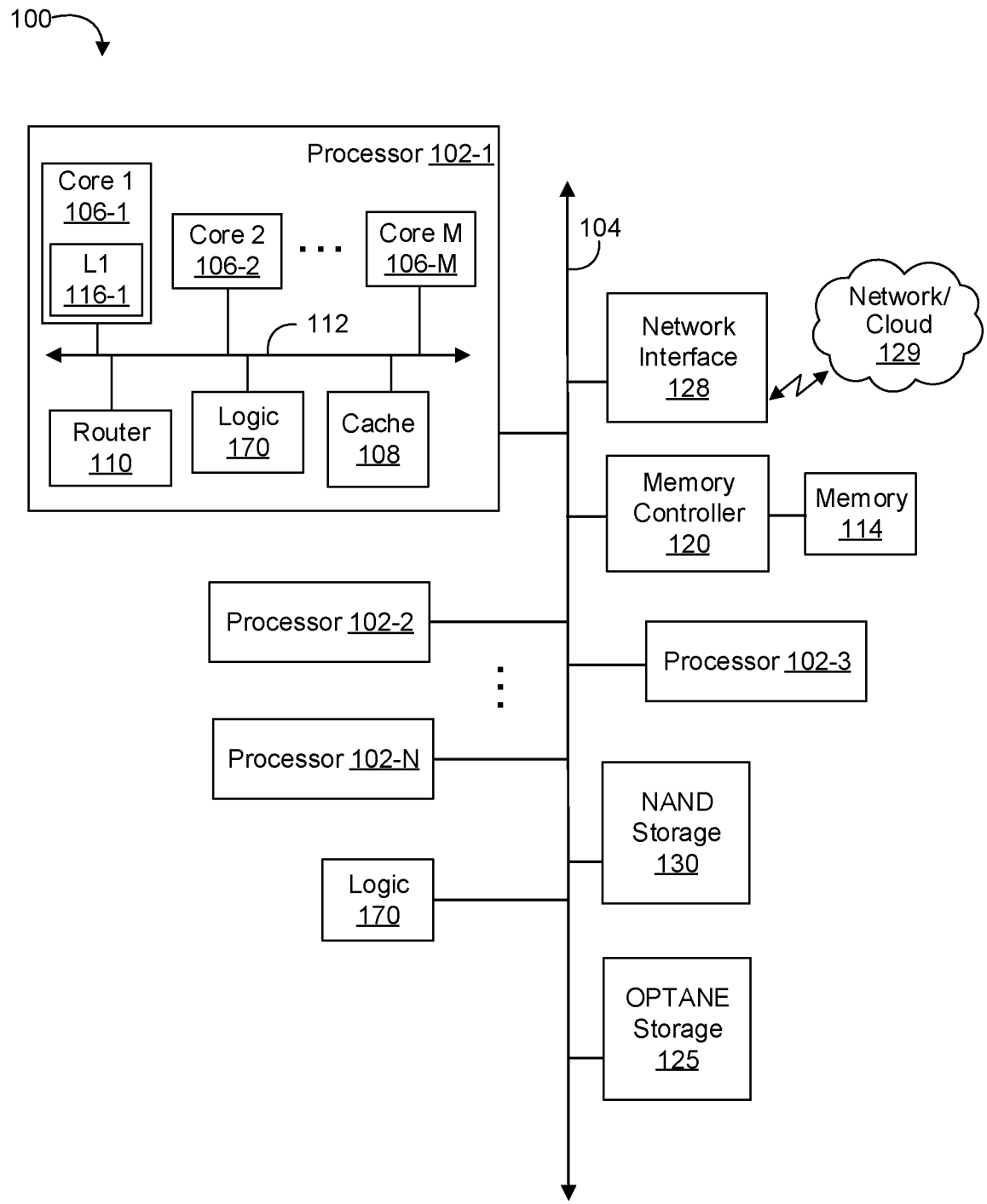
FIG. 9 is a block diagram of another example of a computing system according to an embodiment.

Turning now to FIG. 9, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 9, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 9, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a first storage device such as NAND storage 130 coupled to the interconnect 104 via NAND controller logic, which may control access by various components of system 100 to the NAND storage 130. Furthermore, even though NAND storage 130 is shown to be directly coupled to the interconnection 104 in FIG. 9, the NAND controller logic can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 100 (for example where the storage bus is coupled to interconnect 104 via some other logic like a bus bridge, chipset, etc.) Additionally, the NAND controller logic may be incorporated into memory controller logic or provided on a same integrated circuit (IC) device with other components in various embodiments (e.g., on the same circuit board device as the NAND storage 130 or in the same enclosure as the NAND storage 130). For example, the NAND storage 130 may comprise a flash memory device, a SSD, etc.

Furthermore, the NAND controller logic and/or NAND storage 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, NAND storage 130, SSD bus, SATA bus, logic 170, etc., to sense variations in various factors affecting power/thermal behavior of the system/platform, such as temperature, operating frequency, operating voltage, power consumption, and/or inter-core communication activity, etc.

System 100 may also include a second storage device such as OPTANE storage 125 coupled to the interconnect 104 via OPTANE controller logic, which may control access by various components of system 100 to the OPTANE storage 125. Furthermore, even though OPTANE storage 125 is shown to be directly coupled to the interconnection 104 in FIG. 9, the OPTANE controller logic can alternatively communicate via a memory bus interconnect (e.g., DDR) or a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 100 (for example where the storage bus is coupled to interconnect 104 via some other logic like a bus bridge, chipset, etc.) Additionally, the OPTANE controller logic may be incorporated into memory controller logic or provided on a same integrated circuit (IC) device with other components in various embodiments (e.g., on the same circuit board device as the OPTANE storage 125 or in the same enclosure as the OPTANE storage 125). For example, the OPTANE storage 125 may comprise a persistent memory (PMEM) device, a dual inline memory module (DIMM), an OPTANE SSD, etc.

Furthermore, the OPTANE controller logic and/or OPTANE storage 125 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, OPTANE storage 125, SSD bus, SATA bus, logic 170, etc., to sense variations in various factors affecting power/thermal behavior of the system/platform, such as temperature, operating frequency, operating voltage, power consumption, and/or inter-core communication activity, etc.

As illustrated in FIG. 9, the system 100 may include logic 170, which may be in the same enclosure as the processor(s) 102 and/or fully integrated on a printed circuit board (PCB) of the processor(s) 102. One or more of the features/aspects/operations discussed with reference to FIGS. 1-8 may be performed by one or more of the components of FIG. 9. Also, one or more of the features/aspects/operations of FIGS. 1-8 may be programmed into firmware. Advantageously, the logic 170 may include technology to implement one or more aspects of the system 10 (FIG. 1), the apparatus 15 (FIG. 2), the method 20 (FIGS. 3A to 3B), the storage manager 40 (FIG. 4), the process flow 50 (FIG. 5), the method 60 (FIG. 6), the system 74 (FIG. 7), the process flow 80 (FIG. 8), and/or any of the features discussed herein. For example, the logic 170 may include technology to implement the host device/computer system/agent aspects of the various embodiments described herein.

In particular, the logic 170 may be configured to manage access to the storage system (e.g., OPTANE storage 125 and the NAND storage 130), capture input/output (IO) telemetry for a workload on the storage system associated with a runtime application, determine one or more write reduction factors for the workload based on the captured IO telemetry, determine one or more write invalidation factors for the workload based on the captured IO telemetry, and allocate storage for the workload between the OPTANE storage 125 and the NAND storage 130 based on the one or more write reduction factors and the one or more write invalidation factors. For example, the logic 170 may be configured to calculate a write reduction factor for an input/output transaction as a number of first persistent storage device writes divided by a number of host writes, and/or to calculate a write invalidation factor for an input/output transaction as a number of host writes divided by an amount of storage space occupied by the workload.

In some embodiments, the logic 170 may be configured to classify the IO telemetry into two or more data classes, calculate a write invalidation factor for each of the two or more data classes, and select a subset of the two or more data classes with the highest write invalidation factors for potential placement of data on the first persistent storage device. The logic 170 may be further configured to calculate a write reduction factor for each data class of the subset of the two or more data classes, determine if the subset of the two or more data classes meets one or more fitness criteria based on the calculated write invalidation factors and the calculated write reduction factors for the subset of the two or more data classes, and if so determined, place data that corresponds to the subset of the two or more data classes on the OPTANE storage 125. In some embodiments, the workload may be associated with a runtime application and the logic 170 may be further configured to provide closed-loop allocation of storage between the OPTANE storage 125 and the NAND storage 130 at runtime based on the calculated write invalidation factors, the calculated write reduction factors, and the one or more fitness criteria.

Embodiments of each of the logic 170, and other system components may be implemented in hardware, software, or any suitable combination thereof. For example, hardware implementations may include configurable logic such as, for example, PLAs, FPGAs, CPLDs, or fixed-functionality logic hardware using circuit technology such as, for example, ASIC, CMOS or TTL technology, or any combination thereof. In some embodiments, all or portions of the logic 170, and/or other system memory may be located in, or co-located with, various components, including the processor(s) 102 (e.g., on a same die, in a same enclosure, etc.).

Alternatively, or additionally, all or portions of these components may be implemented in one or more modules as a set of logic instructions stored in a machine- or computer-readable storage medium such as RAM), ROM, PROM, firmware, flash memory, etc., to be executed by the processor(s) 102. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 114, or other system memory may store a set of instructions which when executed by the processor(s) 102 cause the system 100 to implement one or more components, features, or aspects of the logic 170.

In other embodiments, the NAND storage 130 and/or the OPTANE storage may be replaced with any suitable storage/memory technology/media. In some embodiments, the logic 170 may be coupled to one or more substrates (e.g., silicon, sapphire, gallium arsenide, printed circuit board (PCB), etc.), and may include transistor channel regions that are positioned within the one or more substrates. The NAND storage 130 may alternatively, or additionally, include persistent volatile memory (e.g., battery or capacitor backed-up DRAM or SRAM). For example, the NAND storage 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIG. 9, features or aspects of the logic 170 may be distributed throughout the system 100, and/or co-located/integrated with various components of the system 100.

Additional Notes and Examples

Example 1 includes an electronic apparatus, comprising one or more substrates, and logic coupled to the one or more substrates, the logic to manage access to a storage system that includes a first persistent storage device and a second persistent storage device, capture input/output telemetry for a workload on the storage system, determine one or more write reduction factors and one or more write invalidation factors for the workload based on the captured input/output telemetry, and allocate storage for the workload between the first persistent storage device and the second persistent storage device based on the one or more write reduction factors and the one or more write invalidation factors.

Example 2 includes the apparatus of Example 1, wherein the logic is further to calculate a write reduction factor for an input/output transaction as a number of first persistent storage device writes divided by a number of host writes.

Example 3 includes the apparatus of any of Examples 1 to 2, wherein the logic is further to calculate a write invalidation factor for an input/output transaction as a number of host writes divided by an amount of storage space occupied by the workload.

Example 4 includes the apparatus of any of Examples 1 to 3, wherein the logic is further to classify the input/output telemetry into two or more data classes, calculate a write invalidation factor for each of the two or more data classes, and select a subset of the two or more data classes with the highest write invalidation factors for potential placement of data on the first persistent storage device.

Example 5 includes the apparatus of Example 4, wherein the logic is further to calculate a write reduction factor for each data class of the subset of the two or more data classes, determine if the subset of the two or more data classes meets one or more fitness criteria based on the calculated write invalidation factors and the calculated write reduction factors for the subset of the two or more data classes, and if so determined, place data that corresponds to the subset of the two or more data classes on the first persistent storage device.

Example 6 includes the apparatus of Example 5, wherein the workload is associated with a runtime application and wherein the logic is further to provide closed-loop allocation of storage between the first persistent storage device and the second persistent storage device at runtime based on the calculated write invalidation factors, the calculated write reduction factors, and the one or more fitness criteria.

Example 7 includes the apparatus of any of Examples 1 to 6, wherein the first persistent storage device comprises three dimensional crosspoint-based media and the second persistent storage device comprises NAND-based media.

Example 8 includes an electronic system, comprising storage system that includes a first persistent storage device and a second persistent storage device, and a storage manager communicatively coupled to the storage system, the storage manager including logic to manage access to the storage system, capture input/output telemetry for a workload on the storage system associated with a runtime application, determine one or more write reduction factors and one or more write invalidation factors for the workload based on the captured input/output telemetry, and allocate storage for the workload between the first persistent storage device and the second persistent storage device based on the one or more write reduction factors and the one or more write invalidation factors.

Example 9 includes the system of Example 8, wherein the logic is further to calculate a write reduction factor for an input/output transaction as a number of first persistent storage device writes divided by a number of host writes.

Example 10 includes the system of any of Examples 8 to 9, wherein the logic is further to calculate a write invalidation factor for an input/output transaction as a number of host writes divided by an amount of storage space occupied by the workload.

Example 11 includes the system of any of Examples 8 to 10, wherein the logic is further to classify the input/output telemetry into two or more data classes, calculate a write invalidation factor for each of the two or more data classes, and select a subset of the two or more data classes with the highest write invalidation factors for potential placement of data on the first persistent storage device.

Example 12 includes the system of Example 11, wherein the logic is further to calculate a write reduction factor for each data class of the subset of the two or more data classes, determine if the subset of the two or more data classes meets one or more fitness criteria based on the calculated write invalidation factors and the calculated write reduction factors for the subset of the two or more data classes, and if so determined, place data that corresponds to the subset of the two or more data classes on the first persistent storage device.

Example 13 includes the system of Example 12, wherein the workload is associated with a runtime application and wherein the logic is further to provide closed-loop allocation of storage between the first persistent storage device and the second persistent storage device at runtime based on the calculated write invalidation factors, the calculated write reduction factors, and the one or more fitness criteria.

Example 14 includes the system of any of Examples 8 to 13, wherein the first persistent storage device comprises three dimensional crosspoint-based media and the second persistent storage device comprises NAND-based media.

Example 15 includes a method of managing storage, comprising managing access to a storage system that includes a first persistent storage device and a second persistent storage device, capturing input/output telemetry for a workload on the storage system, determining one or more write reduction factors and one or more write invalidation factors for the workload based on the captured input/output telemetry, and allocating storage for the workload between the first persistent storage device and the second persistent storage device based on the one or more write reduction factors and the one or more write invalidation factors.

Example 16 includes the method of Example 15, further comprising calculating a write reduction factor for an input/output transaction as a number of first persistent storage device writes divided by a number of host writes.

Example 17 includes the method of any of Examples 15 to 16, further comprising calculating a write invalidation factor for an input/output transaction as a number of host writes divided by an amount of storage space occupied by the workload.

Example 18 includes the method of any of Examples 15 to 17, further comprising classifying the input/output telemetry into two or more data classes, calculating a write invalidation factor for each of the two or more data classes, and selecting a subset of the two or more data classes with the highest write invalidation factors for potential placement of data on the first persistent storage device.

Example 19 includes the method of Example 18, further comprising calculating a write reduction factor for each data class of the subset of the two or more data classes, determining if the subset of the two or more data classes meets one or more fitness criteria based on the calculated write invalidation factors and the calculated write reduction factors for the subset of the two or more data classes, and if so determined, placing data that corresponds to the subset of the two or more data classes on the first persistent storage device.

Example 20 includes the method of Example 19, wherein the workload is associated with a runtime application, the method further comprising providing closed-loop allocation of storage between the first persistent storage device and the second persistent storage device at runtime based on the calculated write invalidation factors, the calculated write reduction factors, and the one or more fitness criteria.

Example 21 includes the method of any of Examples 15 to 20, wherein the first persistent storage device comprises three dimensional crosspoint-based media and the second persistent storage device comprises NAND-based media.

Example 22 includes at least one non-transitory one machine readable medium comprising a plurality of instructions that, in response to being executed on a computing device, cause the computing device to manage access to a storage system that includes a first persistent storage device with a first set of storage characteristics and a second persistent storage device with a second set of storage characteristics that are different from the first set of storage characteristics, capture input/output telemetry for a workload on the storage system, determine one or more write reduction factors for the workload based on the captured input/output telemetry, determine one or more write invalidation factors for the workload based on the captured input/output telemetry, and allocate storage for the workload between the first persistent storage device and the second persistent storage device based on the one or more write reduction factors and the one or more write invalidation factors.

Example 23 includes the at least one non-transitory one machine readable medium of Example 22, comprising a plurality of further instructions that, in response to being executed on the computing device, cause the computing device to calculate a write reduction factor for an input/output transaction as a number of first persistent storage device writes divided by a number of host writes.

Example 24 includes the at least one non-transitory one machine readable medium of any of Examples 22 to 23, wherein the first application corresponds to a virtual machine, comprising a plurality of further instructions that, in response to being executed on the computing device, cause the computing device to calculate a write invalidation factor for an input/output transaction as a number of host writes divided by an amount of storage space occupied by the workload.

Example 25 includes the at least one non-transitory one machine readable medium of any of Examples 22 to 24, comprising a plurality of further instructions that, in response to being executed on the computing device, cause the computing device to classify the input/output telemetry into two or more data classes, calculate a write invalidation factor for each of the two or more data classes, and select a subset of the two or more data classes with the highest write invalidation factors for potential placement of data on the first persistent storage device.

Example 26 includes the at least one non-transitory one machine readable medium of Example 25, comprising a plurality of further instructions that, in response to being executed on the computing device, cause the computing device to calculate a write reduction factor for each data class of the subset of the two or more data classes, determine if the subset of the two or more data classes meets one or more fitness criteria based on the calculated write invalidation factors and the calculated write reduction factors for the subset of the two or more data classes, and if so determined, place data that corresponds to the subset of the two or more data classes on the first persistent storage device.

Example 27 includes the at least one non-transitory one machine readable medium of Example 26, wherein the workload is associated with a runtime application, comprising a plurality of further instructions that, in response to being executed on the computing device, cause the computing device to provide closed-loop allocation of storage between the first persistent storage device and the second persistent storage device at runtime based on the calculated write invalidation factors, the calculated write reduction factors, and the one or more fitness criteria.

Example 28 includes the at least one non-transitory one machine readable medium of any of Examples 22 to 27, wherein the first persistent storage device comprises three dimensional crosspoint-based media and the second persistent storage device comprises NAND-based media.

Example 29 includes a storage manager apparatus, comprising means for managing access to a storage system that includes a first persistent storage device with a first set of storage characteristics and a second persistent storage device with a second set of storage characteristics that are different from the first set of storage characteristics, means for capturing input/output telemetry for a workload on the storage system, means for determining one or more write reduction factors for the workload based on the captured input/output telemetry, means for determining one or more write invalidation factors for the workload based on the captured input/output telemetry, and means for allocating storage for the workload between the first persistent storage device and the second persistent storage device based on the one or more write reduction factors and the one or more write invalidation factors.

Example 30 includes the apparatus of Example 29, further comprising means for calculating a write reduction factor for an input/output transaction as a number of first persistent storage device writes divided by a number of host writes.

Example 31 includes the apparatus of any of Examples 29 to 30, further comprising means for calculating a write invalidation factor for an input/output transaction as a number of host writes divided by an amount of storage space occupied by the workload.

Example 32 includes the apparatus of any of Examples 29 to 31, further comprising means for classifying the input/output telemetry into two or more data classes, means for calculating a write invalidation factor for each of the two or more data classes, and means for selecting a subset of the two or more data classes with the highest write invalidation factors for potential placement of data on the first persistent storage device.

Example 33 includes the apparatus of Example 32, further comprising means for calculating a write reduction factor for each data class of the subset of the two or more data classes, means for determining if the subset of the two or more data classes meets one or more fitness criteria based on the calculated write invalidation factors and the calculated write reduction factors for the subset of the two or more data classes, and if so determined, means for placing data that corresponds to the subset of the two or more data classes on the first persistent storage device.

Example 34 includes the apparatus of Example 33, wherein the workload is associated with a runtime application, the apparatus further comprising means for providing closed-loop allocation of storage between the first persistent storage device and the second persistent storage device at runtime based on the calculated write invalidation factors, the calculated write reduction factors, and the one or more fitness criteria.

Example 35 includes the apparatus of any of Examples 29 to 34, wherein the first persistent storage device comprises three dimensional crosspoint-based media and the second persistent storage device comprises NAND-based media.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds, costs, and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   integrated circuitry coupled to the one or more substrates, the integrated circuitry configured to:
   manage access to a storage system that includes a first persistent storage device and a second persistent storage device;
   capture input/output telemetry for a workload on the storage system;
   determine one or more write reduction factors and one or more write invalidation factors for the workload based on the captured input/output telemetry, the one or more write reduction factors to comprise a first write reduction factor for a first input/output transaction, the one or more write invalidation factors to comprise a first write invalidation factor for a second input/output transaction, wherein the integrated circuitry to determine the one or more write reduction factors and the one or more write invalidation factors comprises the integrated circuitry to:
   calculate the first write reduction factor as being equal to a first ratio of a number of first writes to the first persistent storage device to a number of second writes by a host processor; and
   calculate the first write invalidation factor as being equal to a second ratio of a number of third writes by the host processor to an amount of storage space occupied by the workload; and
   allocate storage for the workload between the first persistent storage device and the second persistent storage device based on each of the one or more write reduction factors and on each of the one or more write invalidation factors.

2. The electronic apparatus of claim 1, wherein the integrated circuitry is further configured to:
   classify the input/output telemetry into two or more data classes;
   calculate a write invalidation factor for each of the two or more data classes; and
   select a subset of the two or more data classes with the highest write invalidation factors for potential placement of data on the first persistent storage device.

3. The electronic apparatus of claim 2, wherein the integrated circuitry is further configured to:
   calculate a write reduction factor for each data class of the subset of the two or more data classes;
   determine if the subset of the two or more data classes meets one or more fitness criteria based on the calculated write invalidation factors and the calculated write reduction factors for the subset of the two or more data classes; and if so determined,
   place data that corresponds to the subset of the two or more data classes on the first persistent storage device.

4. The electronic apparatus of claim 3, wherein the workload is associated with a runtime application and wherein the integrated circuitry is further configured to:
   provide closed-loop allocation of storage between the first persistent storage device and the second persistent storage device at runtime based on the calculated write invalidation factors, the calculated write reduction factors, and the one or more fitness criteria.

5. The electronic apparatus of claim 1, wherein the first persistent storage device comprises three dimensional crosspoint-based media and the second persistent storage device comprises NAND-based media.

6. An electronic system, comprising:
   storage system that includes a first persistent storage device and a second persistent storage device; and
   a storage manager communicatively coupled to the storage system, the storage manager including integrated circuitry configured to:
   manage access to the storage system;
   capture input/output telemetry for a workload on the storage system associated with a runtime application;

determine one or more write reduction factors and one or more write invalidation factors for the workload based on the captured input/output telemetry, the one or more write reduction factors to comprise a first write reduction factor for a first input/output transaction, the one or more write invalidation factors to comprise a first write invalidation factor for a second input/output transaction, wherein the integrated circuitry to determine the one or more write reduction factors and the one or more write invalidation factors comprises the integrated circuitry to:
  calculate the first write reduction factor as being equal to a first ratio of a number of first writes to the first persistent storage device to a number of second writes by a host processor; and
  calculate the first write invalidation factor as being equal to a second ratio of a number of third writes by the host processor to an amount of storage space occupied by the workload; and
allocate storage for the workload between the first persistent storage device and the second persistent storage device based on each of the one or more write reduction factors and on each of the one or more write invalidation factors.

7. The electronic system of claim 6, wherein the integrated circuitry is further configured to:
classify the input/output telemetry into two or more data classes;
calculate a write invalidation factor for each of the two or more data classes; and
select a subset of the two or more data classes with the highest write invalidation factors for potential placement of data on the first persistent storage device.

8. The electronic system of claim 7, wherein the integrated circuitry is further configured to:
calculate a write reduction factor for each data class of the subset of the two or more data classes;
determine if the subset of the two or more data classes meets one or more fitness criteria based on the calculated write invalidation factors and the calculated write reduction factors for the subset of the two or more data classes; and if so determined,
place data that corresponds to the subset of the two or more data classes on the first persistent storage device.

9. The electronic system of claim 8, wherein the workload is associated with a runtime application and wherein the integrated circuitry is further configured to:
provide closed-loop allocation of storage between the first persistent storage device and the second persistent storage device at runtime based on the calculated write invalidation factors, the calculated write reduction factors, and the one or more fitness criteria.

10. The electronic system of claim 6, wherein the first persistent storage device comprises three dimensional crosspoint-based media and the second persistent storage device comprises NAND-based media.

11. A method of managing storage, the method comprising:
with integrated circuitry which is coupled to a storage system that includes a first persistent storage device and a second persistent storage device:
  managing access to the storage system;
  capturing input/output telemetry for a workload on the storage system;
  determining one or more write reduction factors and one or more write invalidation factors for the workload based on the captured input/output telemetry, the one or more write reduction factors comprising a first write reduction factor for a first input/output transaction, the one or more write invalidation factors comprising a first write invalidation factor for a second input/output transaction, wherein the determining the one or more write reduction factors and the one or more write invalidation factors comprises:
    calculating the first write reduction factor as being equal to a first ratio of a number of first writes to the first persistent storage device to a number of second writes by a host processor; and
    calculating the first write invalidation factor as being equal to a second ratio of a number of third writes by the host processor to an amount of storage space occupied by the workload; and
  allocating storage for the workload between the first persistent storage device and the second persistent storage device based on each of the one or more write reduction factors and on each of the one or more write invalidation factors.

12. The method of claim 11, further comprising:
classifying the input/output telemetry into two or more data classes;
calculating a write invalidation factor for each of the two or more data classes; and
selecting a subset of the two or more data classes with the highest write invalidation factors for potential placement of data on the first persistent storage device.

13. The method of claim 12, further comprising:
calculating a write reduction factor for each data class of the subset of the two or more data classes;
determining if the subset of the two or more data classes meets one or more fitness criteria based on the calculated write invalidation factors and the calculated write reduction factors for the subset of the two or more data classes; and if so determined,
placing data that corresponds to the subset of the two or more data classes on the first persistent storage device.

14. The method of claim 13, wherein the workload is associated with a runtime application, the method further comprising:
providing closed-loop allocation of storage between the first persistent storage device and the second persistent storage device at runtime based on the calculated write invalidation factors, the calculated write reduction factors, and the one or more fitness criteria.

* * * * *